United States Patent [19]

Hänsel

[11] Patent Number: 4,822,233

[45] Date of Patent: Apr. 18, 1989

[54] APPARATUS FOR REMOVING SPRUE SLUGS FROM AN INJECTION MOLDING MACHINE

[75] Inventor: Mathias Hänsel, Kandern, Fed. Rep. of Germany

[73] Assignee: A. Raymond, Lorrach, Fed. Rep. of Germany

[21] Appl. No.: 95,261

[22] Filed: Sep. 11, 1987

[30] Foreign Application Priority Data

Sep. 15, 1986 [DE] Fed. Rep. of Germany ....... 3631314

[51] Int. Cl.$^4$ ............................................ B65H 29/02
[52] U.S. Cl. ..................................... 414/225; 414/718; 414/729; 414/917
[58] Field of Search ............... 414/680, 729, 222, 225, 414/917, 718

[56] References Cited

U.S. PATENT DOCUMENTS

| | | | |
|---|---|---|---|
| 4,102,461 | 7/1978 | Soyland | 414/694 |
| 4,553,899 | 11/1985 | Magni | 414/716 X |
| 4,585,389 | 4/1986 | Watanabe et al. | 414/917 X |
| 4,621,562 | 11/1986 | Carr et al. | 414/729 X |
| 4,635,493 | 1/1987 | Buckley | 414/917 X |

FOREIGN PATENT DOCUMENTS

| | | | |
|---|---|---|---|
| 489139 | 11/1976 | Australia | 414/718 |
| 1110079 | 6/1961 | Fed. Rep. of Germany | 414/680 |
| 1215994 | 3/1986 | U.S.S.R. | 414/718 |

OTHER PUBLICATIONS

Getecha-Handling Equipment for Sprue and Molding Removal.

Primary Examiner—Robert J. Spar
Assistant Examiner—William M. Hienz
Attorney, Agent, or Firm—Finnegan, Henderson, Farabow, Garrett & Dunner

[57] ABSTRACT

Apparatus for removing plastic sprue slugs from the mold of an injection molding machine including a housing, a swivel arm rotatably mounted in the housing about a horizontal axis, a gripping arm pivotally mounted to the outer end of the swivel arm and having fingers for gripping and removing the slug, a steering rod for pivoting the gripping arm about the swivel arm as the swivel arm rotates about its axis and a cam for controlling movement of the steering rod, the cam, upon rotation of the swivel arm from an upper waiting position to a lower gripping position, causing the fingers to first trace a circular path until they reach a level approximately level with the top of the mold and then a path that extends substantially vertically downward along the front side of the mold until they reach a protruding sprue slug.

3 Claims, 4 Drawing Sheets

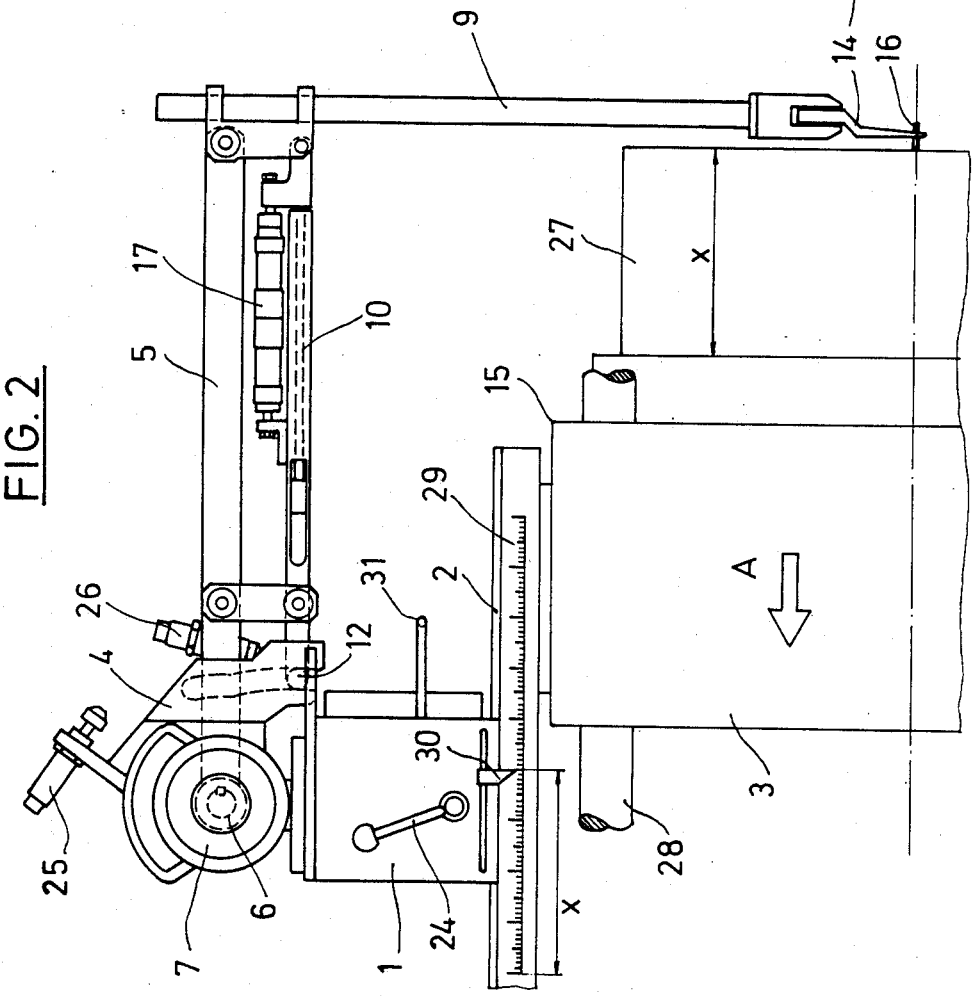

APPARATUS FOR REMOVING SPRUE SLUGS FROM AN INJECTION MOLDING MACHINE

BACKGROUND OF THE INVENTION

This invention relates to apparatus for removing the sprue slugs from plastic molding machines such as injection molding machines. This apparatus has a gripping arm and is mounted on the movable platen of the machine so that when the mold of the machine is opened, the gripping arm is guided by a cam control up to the sprue where gripping fingers located at the lower end of the arm grasp the slug for removal at the same time as the molded articles are being ejected from the mold.

In apparatus of this type, usually a crank arm, activated by a hydraulic cylinder, has a roller which runs along a guide rail connected to the stationary platen of the molding machine. The gripping arm is swivelled up and down by the movement of the cylinder. At the same time, a steering rod is guided by the roller running along the guide rail so that at the end of the downward movement of the arm, the gripping fingers are guided up to the sprue slug.

After gripping the slug, the fingers are moved away from the mold by extension of the steering rod, taken upwards by a swivelling up of the gripping arm and then swivelled out sideways by rotation of the arm. There, the gripping fingers open automatically and drop the slug into a hopper, suitably located above a grinding device. The slugs are then granulated and collected for reuse.

In this type of apparatus, the mechanical control for the crank arm poses a problem because the control rail fixed to the stationary platen of the machine has to be removed and subsequently reassembled each time a mold is changed. Also the rail has to be realigned each time with respect to the position of the fingers so that they will operate correctly at the various locations of the arm. This takes time and delays the start of a subsequent molding operation.

An object of the invention therefore is to provide a more simplified mechanism for removal of the slugs while at the same time making it easier to change a mold.

SUMMARY OF THE INVENTION

In accordance with the invention, apparatus is provided for the removal of plastic sprue slugs from the mold of an injection molding machine, comprising a housing for mounting to a mold half of the machine, a swivel arm rotatably mounted at one end in the housing about a horizontal axis, means for rotating the arm between an upper waiting position and a lower gripping position, a gripping arm pivotally mounted at its upper end to the opposite end of the swivel arm, a pair of fingers for gripping the slugs located at the lower end of the gripping arm, means for operating the fingers, a steering rod running parallel to the swivel arm and being pivotally connected between the swivel arm and the gripping arm to form a hinged parallelogram and cam means for controlling movement of the hinged parallelogram upon rotation of the swivel arm, said cam means comprising a roller at the end of the steering rod nearest the housing and two mutually parallel cam surfaces mounted in the housing for guiding the roller, which surfaces upon rotation of the swivel arm from its upper position to its lower position, cause the fingers at the end of the gripping arm to first trace a circular path until the fingers reach a level approximately level with the top side of the mold half and then to trace a path substantially vertically downward along the front side of the mold half to a sprue slug protruding from said mold when it is opened.

BRIEF DESCRIPTION OF THE DRAWINGS

An embodiment of the invention is described in more detail in the drawings in which

FIG. 2 shows the removal apparatus with the gripping arm in a lowered and gripping position;

FIG. 3 is a partial view of the front of the gripping arm;

DETAILED DESCRIPTION OF THE INVENTION

Figure 1:
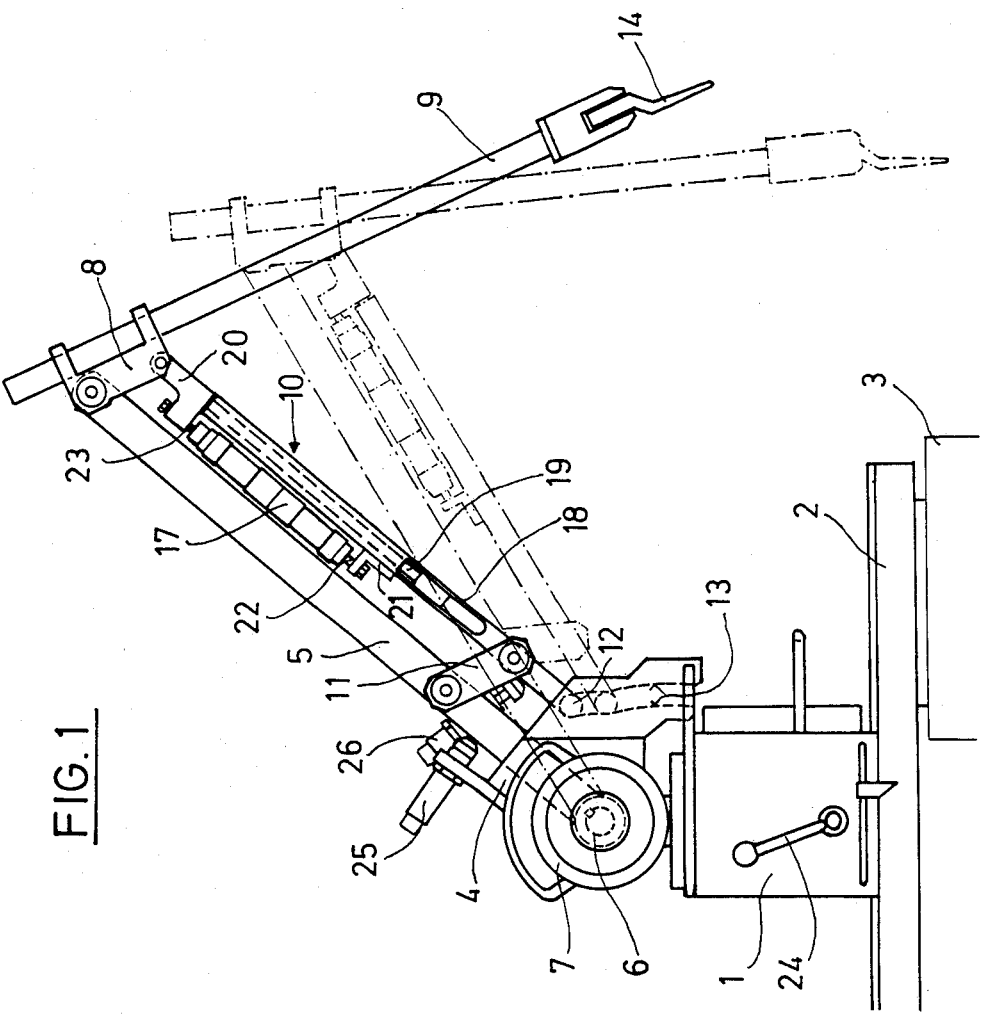
FIG. 1 shows the removal apparatus of the invention with the gripping arm in a raised and waiting position.

With reference to the drawings, the sprue slug removal apparatus of this invention comprises a housing 4 having a swivel arm 5, which is rotatably mounted in housing 4 on a horizontal shaft 6 and can be swivelled up and down via a crank drive means 7. Housing 4 is mounted to a frame 1 for rotation about a vertical axis. Lower frame 1 is slidably mounted for movement on a guide rail 2, which is fixed to the moveable platen 3 of the injection molding machine.

Rotatably mounted at the free or upper end of swivel arm 5 is a retaining link plate 8, to which a gripping arm 9 is mounted for adjustment in an axial direction. Retaining link plate 8 is pivotally connected at one end to arm 5 and at the other to a steering rod 10 running parallel to the swivel arm. Rod 10 in turn is pivotally connected at its other end to a guide link plate 11 to form a hinged parallelogram with arm 5. Steering rod 10 has at its lower end, facing housing 4, a cam means for controlling movement of the steering rod and hence pivotal movement of the gripping arm relative to the swivel arm through the hinged parallelogram upon movement of the swivel arm. The cam means includes a roller 12 at one end of the rod which rides between two downwardly inclined and mutually parallel guiding edges or cam surfaces 13 in housing 4.

Cams 13 extend in their upper region approximately as far as the level of shaft 6 of swivel arm 5 and run initially concentrically with said shaft and from there in a curve spiralling away from the circular path. This has the effect that, during downward movement of swivel arm 5, steering rod 10 and thus gripping arm 9 are controlled such that gripping fingers 14, which are located at the lower end of gripping arm 9, are first lowered out of their upper waiting position in a circular path as far as approximately the level of the upper edge 15 of platen 3; i.e., to the dot-dash position shown in FIG. 1. Then the fingers are lowered by the lower curved part of cams 13 in a substantially vertical direction and along a line just in front of a mold half 27 of the machine up to a protruding sprue slug 16, as shown in FIG. 2.

Figure 4:
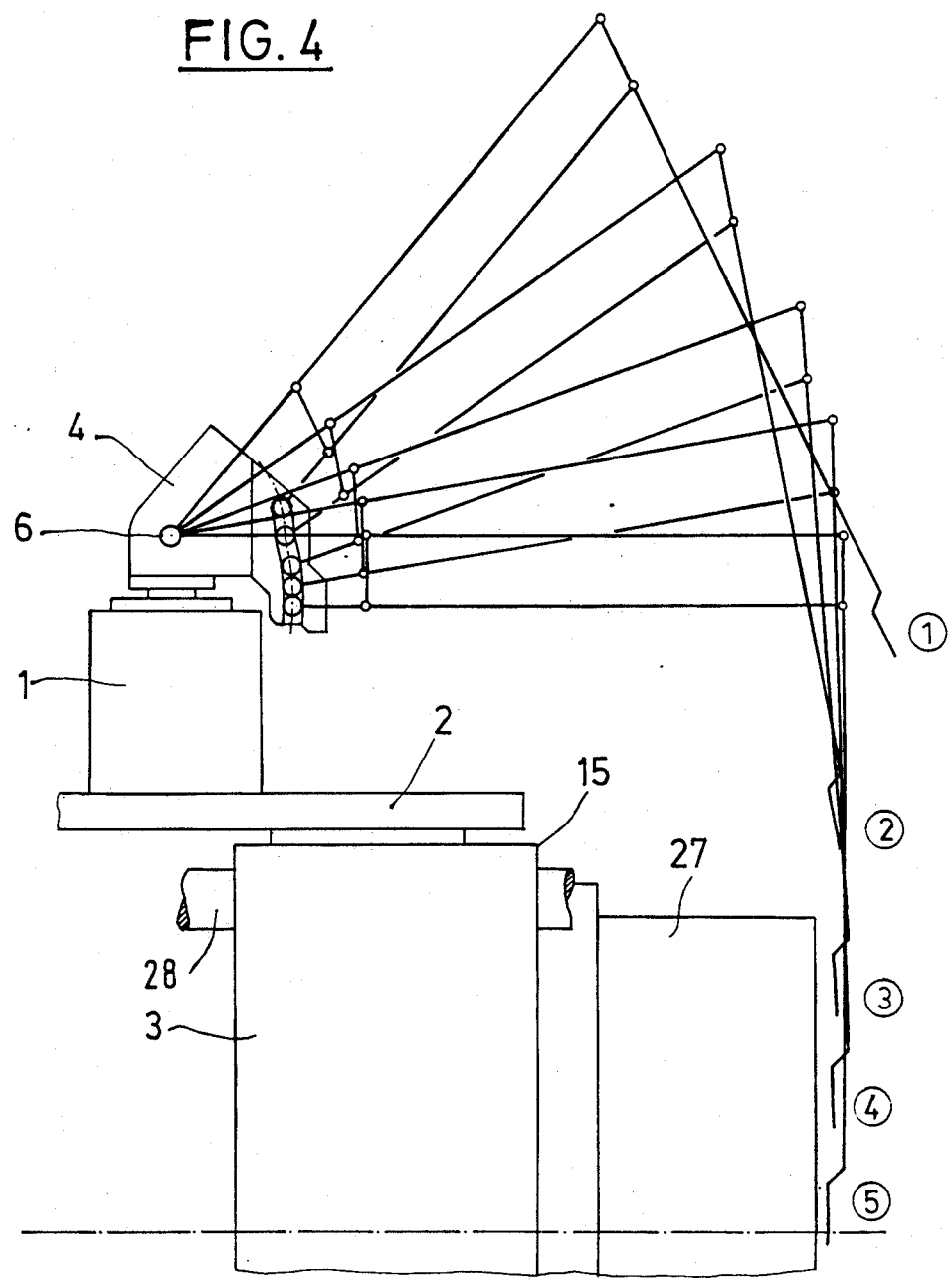
FIG. 4 is diagrammatic view of the swivel and gripping arms during downward movement.

The sequence of movement of swivel arm 5 and gripping arm 9 during the downward movement of the mechanism is shown in FIG. 4. This movement sequence is initiated by a pneumatic control valve (not shown) which operates the crank gear of drive means 7 shortly after the opening stroke of the mold platen 3 on the movable side of the machine. The gear of the crank drive is advantageously equipped with a restoring spring (not shown) so that if the pressure medium fails the arm automatically swivels back again by the force of the spring.

Thus, as soon as a molding operation has been completed and platen 3 and mold half 27 on the movable side of the machine are moved on guide bar 28 in the direction of arrow A for approximately 80 mm, swivel arm 5 is lowered from a waiting position 1 to a gripping position 5 as shown in FIG. 4. Then, gripping fingers 14 are moved together by a suitable mechanism and the sprue slug 16 is thereby grasped between them. Thus, after a short opening stroke of the moveable mold half the gripping fingers can be readily inserted into the mold to remove the slug.

Figure 5:
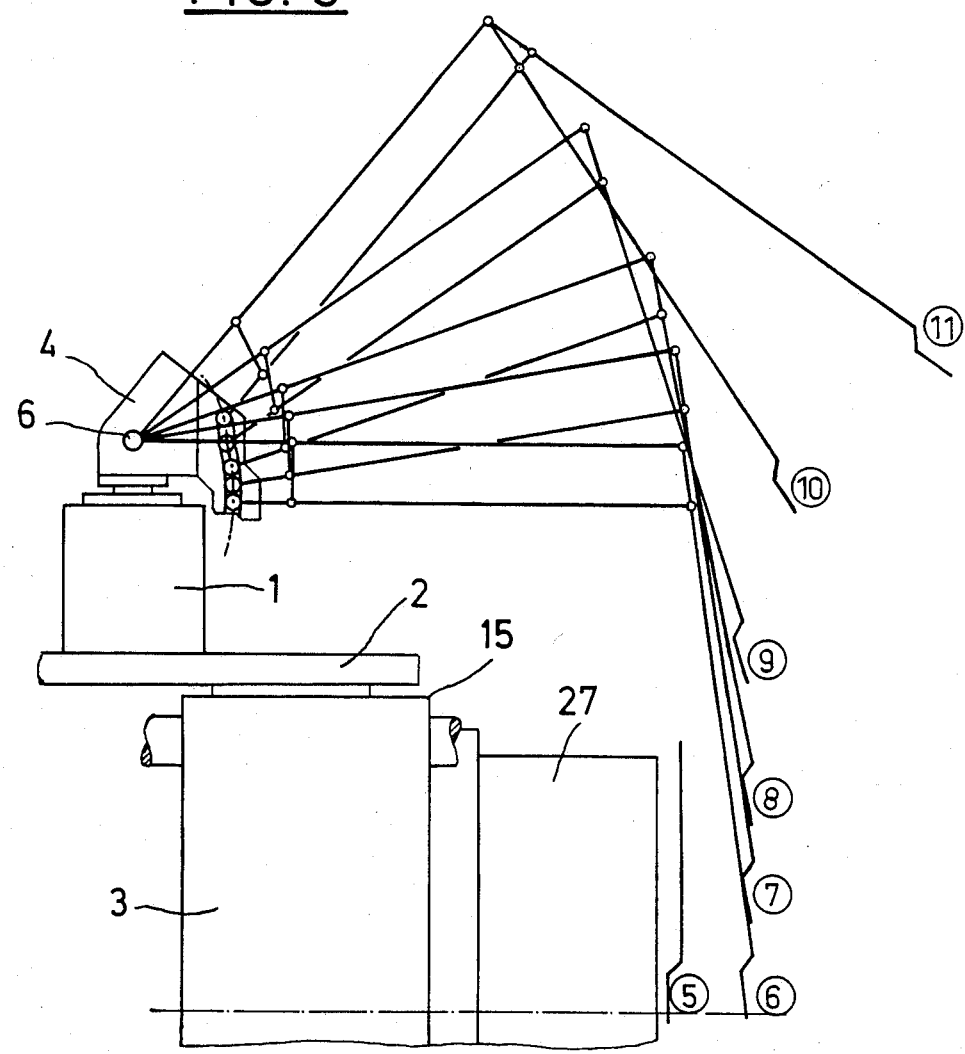
FIG. 5 is a diagrammatic view of the same during upward movement.

The sequence of movement after the sprue slug 16 is gripped is diagrammatically shown in FIG. 5. First, gripping arm 9 is pivotted, with swivel arm 5 remaining stationary, away from mold half 27 to position 6, then swivel arm 5 is raised back to position 10 and then gripping arm 9 is swivelled, again with swivel arm 5 stationary, into position 11.

To be able to pull gripping fingers 14 away from mold half 27 after they have grasped a sprue slug, and, after arm 5 reaches its upper position, to swivel the arm 9 from positions 10 to 11, steering rod 10 is extendable by a double-acting hydraulic cylinder 17. For this purpose, the steering rod 10 comprises an outer tube 18 and an inner rod 19 which is longitudinally displaceable therein and is rotatably mounted via an end piece 20 in retaining link plate 8. Fixed on tube 18 is a bracket 21, which is connected to a downwardly projecting piston rod 22 of hydraulic cylinder 17, while the upwardly projecting piston rod 23 is fixed to end piece 20. During the first extending movement of steering rod 10 to move the fingers from position 5 to 6, piston rod 22 is pushed out by the cylinder to lengthen rod 10. For the second extending movement, from position 10 to position 11, piston rod 23 is pushed out by the cylinder to extend the rod even further.

After reaching position 11, the housing 4 is rotated about its vertical axis through approximately 90° and to the side of the machine using any suitable type of drive means. Then, the mechanism for the gripping fingers 14 opens them and the sprue slug drops into a hopper (not shown) where it is fed into a suitable grinding device.

To dampen the upward movement of swivel arm 5, a damper 25 is fixed to housing 4, which engages with arm 5, to minimize vibration at the end of its upward movement. Similarly, a damper 26 which engages with housing 4 minimizes vibration at the end of its downward movement.

A lever 24 is provided as part of a clamping mechanism located on frame 1, for clamping the mechanism firmly on the guide rail 2 after precise alignment of the gripping fingers 14 with a sprue slug 16.

For easier and faster positioning of the removal apparatus, a scale 29 is fitted on guide rail 2 and a pointer 30 is fixed to lower frame 1 over the scale. Thus, in a mold change, after determining the distance "x" of a mold half 27 on the movable side, the lower frame 1 can be moved until the pointer 30 on the scale 29 has reached the same value "x", measured from the start of the scale. The lower frame then can be simply clamped in place on rail 2 by turning lever 24.

By not mounting the guide rail for controlling movement of the steering rod on the stationary platen of the molding machine as in the prior art, but instead guiding movement of the rod by a specifically defined cam surface fixed to the housing, so that the fingers traverse both a circular and a vertical path, the molds can be changed much quicker than in the past.

What is claimed is:

1. Apparatus for removing plastic sprue slugs protuding from a mold half of an injection molding machine, comprising a housing, a swivel arm rotatably mounted at one end in the housing about a horizontal axis, means for rotating the arm between an upper waiting position and a lower gripping position, a gripping arm pivotally mounted at its upper end to the opposite end of the swivel arm, a pair of fingers for gripping the slugs located at the lower end of the gripping arm, means for operating the fingers, a steering rod running parallel to the swivel arm and being pivotally connected between the swivel arm and the gripping arm to form a hinged parallelogram, said steering rod comprising a tube and a rod longitudinally displaceably therein and including a hydraulic cylinder connected between the tube and the rod for altering the length of the steering rod to thereby pivot the gripping arm about the swivel arm without rotation of the swivel arm and cam means for controlling movement of the hinged parallelogram and pivotal movement of the gripping arm upon rotation of the swivel arm, said cam means comprising a roller at the end of the steering rod nearest the housing and two mutually parallel cam surfaces mounted in the housing for guiding the roller, which surfaces upon rotation of the swivel arm from its upper position to its lower position cause the fingers on the gripping arm to first trace a circular path and then a path substantially vertically downward until they reach a protruding sprue slug.

2. The apparatus of claim 1, including means for adjusting the length of the gripping arm relative to the swivel arm.

3. The apparatus of claim 1, wherein the hydraulic cylinder is a double acting hydraulic cylinder having a piston rod at either end, one of which is connected to the tube and the other to the rod so that the steering rod can be extended to different lengths upon extension of either or both of the piston rods.

* * * * *